US006950745B2

(12) United States Patent
Agnew et al.

(10) Patent No.: US 6,950,745 B2
(45) Date of Patent: Sep. 27, 2005

(54) NAVIGATION SYSTEM

(75) Inventors: Hugh John Agnew, Hampshire (GB); Vincent Geake, Hampshire (GB); Simon Geoffery Hancock, Cambridge (GB)

(73) Assignee: Yeoman Group PLC (GB)

( * ) Notice: Subject to any disclaimer, the term of this patent is extended or adjusted under 35 U.S.C. 154(b) by 50 days.

(21) Appl. No.: 10/276,718

(22) PCT Filed: May 16, 2001

(86) PCT No.: PCT/GB01/02182
§ 371 (c)(1),
(2), (4) Date: May 2, 2003

(87) PCT Pub. No.: WO01/88480
PCT Pub. Date: Nov. 22, 2001

(65) Prior Publication Data
US 2003/0187573 A1 Oct. 2, 2003

(30) Foreign Application Priority Data
May 16, 2000 (GB) ............................................. 0011797

(51) Int. Cl.[7] .............................................. G01C 21/00
(52) U.S. Cl. ...................................... 701/210; 701/209
(58) Field of Search .............................. 701/23, 24, 25, 701/202, 207, 208, 209, 210; 707/10, 102, 104

(56) References Cited
U.S. PATENT DOCUMENTS

| | | |
|---|---|---|
| 3,899,671 A | 8/1975 | Stover |
| 3,940,630 A | 2/1976 | Bergonz |
| 4,009,375 A | 2/1977 | White et al. |
| 4,107,689 A | 8/1978 | Jellinek |
| 4,311,876 A | 1/1982 | Endo et al. |
| 4,325,117 A | 4/1982 | Parmet et al. |
| 4,350,970 A | 9/1982 | von Tomkewitsch |

(Continued)

FOREIGN PATENT DOCUMENTS

| | | |
|---|---|---|
| DE | 196 51 143 A1 | 6/1998 |
| EP | 0 123 562 A1 | 10/1984 |
| EP | 0 465 006 A1 | 1/1992 |
| EP | 0 604 404 A2 | 6/1994 |
| EP | 0 645 603 A1 | 3/1995 |
| EP | 0 756 153 A2 | 1/1997 |
| EP | 0 992 962 A2 | 4/2000 |
| FR | 2 718 532 | 10/1995 |
| GB | 1 215 250 | 12/1970 |

(Continued)

OTHER PUBLICATIONS

Copending U.S. Appl. No. 10/239,501, filed Sep. 23, 2002.
Copending U.S. Appl. No. 10/345,941, filed Jan. 17, 2003.

Primary Examiner—Richard M. Camby
(74) Attorney, Agent, or Firm—Finnegan, Henderson, Farabow, Garrett & Dunner, L.L.P.

(57) ABSTRACT

A navigation guidance system (1) is provided which provides direction information from a remote server (11) to a mobile user unit (2) for guiding user to a desired destination. The navigation guidance system (1) maintains time-related models for traffic speeds expected on road segments of a road database. By maintaining such time-related models, the system can more accurately provide the user with road guidance instructions to arrive at a chosen destination by a given time. The system can also provide more accurate route guidance information to a destination over different routes, even during rush hour or at off peak times. These time related models can be changed as a result of changing traffic patterns or as a result of an incident on a road segment. In a preferred embodiment, therefore, the system continuously monitors each calculated route and advises the users of alternative routes or of updated departure or arrival times as appropriate.

50 Claims, 8 Drawing Sheets

U.S. PATENT DOCUMENTS

| | | | |
|---|---|---|---|
| 4,466,125 | A | 8/1984 | Kanayama |
| 4,951,212 | A | 8/1990 | Kurihara et al. |
| 4,954,958 | A | 9/1990 | Savage et al. |
| 5,025,261 | A | 6/1991 | Ohta et al. |
| 5,043,736 | A | 8/1991 | Darnell et al. |
| 5,155,689 | A | 10/1992 | Wortham |
| 5,172,321 | A | 12/1992 | Ghaem et al. |
| 5,508,917 | A | 4/1996 | Siegle et al. |
| 5,515,043 | A | 5/1996 | Berard et al. |
| 5,543,789 | A | 8/1996 | Behr et al. |
| 5,555,286 | A | 9/1996 | Tendler |
| 5,559,707 | A * | 9/1996 | DeLorme et al. ............ 701/200 |
| 5,712,899 | A | 1/1998 | Pace, II |
| 5,808,566 | A | 9/1998 | Behr et al. |
| 5,887,250 | A | 3/1999 | Shah |
| 5,898,392 | A | 4/1999 | Bambini et al. |
| 5,913,170 | A | 6/1999 | Wortham |
| 5,919,246 | A | 7/1999 | Waizmann et al. |
| 5,928,294 | A * | 7/1999 | Zelinkovsky ................ 701/24 |
| 6,012,012 | A * | 1/2000 | Fleck et al. ................. 701/117 |
| 6,104,316 | A | 8/2000 | Behr et al. |
| 6,107,644 | A | 8/2000 | Shakuda et al. |
| 6,111,539 | A | 8/2000 | Mannings et al. |
| 6,144,336 | A | 11/2000 | Preston et al. |
| 6,169,515 | B1 | 1/2001 | Mannings et al. |
| 6,178,378 | B1 | 1/2001 | Leibold |
| 6,226,529 | B1 | 5/2001 | Bruno et al. |
| 6,236,652 | B1 | 5/2001 | Preston et al. |
| 6,298,306 | B1 | 10/2001 | Suarez et al. |

FOREIGN PATENT DOCUMENTS

| | | |
|---|---|---|
| GB | 1 439 915 | 6/1976 |
| GB | 2 176 964 A | 1/1987 |
| GB | 2 335 492 A | 9/1999 |
| GB | 2 352 292 A | 1/2001 |
| GB | 2 360 588 A | 9/2001 |
| JP | 11-55419 | 2/1999 |
| WO | WO 89/12835 | 12/1989 |
| WO | WO 95/33214 | 12/1995 |
| WO | WO 96/04526 | 2/1996 |
| WO | WO 97/31241 | 8/1997 |
| WO | WO 98/45823 | 10/1998 |
| WO | WO 01/03344 A1 | 1/2001 |
| WO | WO 01/15117 A1 | 3/2001 |
| WO | WO 01/20582 A2 | 3/2001 |
| WO | WO 01/69570 A2 | 9/2001 |
| WO | WO 01/72067 A1 | 9/2001 |
| WO | WO 01/80011 A1 | 10/2001 |
| WO | WO 01/99295 A2 | 12/2001 |
| WO | WO 01/99317 A1 | 12/2001 |
| WO | WO 02/19683 A1 | 3/2002 |
| WO | WO 02/29745 A1 | 4/2002 |

* cited by examiner

NAVIGATION SYSTEM

The present invention relates to a system and method for providing navigation assistance to a user for guiding the user from a source location to a desired destination. The invention is particularly, although not exclusively relevant to a system for providing navigation instructions to a user via a mobile unit, such as a telephone, including an estimated departure time for future travel plans.

Systems have been proposed which provide geographical or position dependent information to a mobile user. Two main types of systems have been proposed to date. These include autonomous systems in which a user computer unit includes a geographic database which it accesses to determine the required geographic or position dependent information; and systems which employ a remote computer unit to determine the appropriate information which is then transmitted to the user via for example a mobile telephone. The main disadvantage of the autonomous system is that the geographic database used to provide the geographic information is stored in the user's computer device and will soon become out-of-date as changes occur to the geographic landscape. This database must therefore be updated on a regular basis which is inconvenient for the user and costly for the service providers. Whilst the system which uses the remote server overcomes this problem, the "client-servers" systems proposed to date have limited functionality and tend to calculate quickest routes and arrival times based on national speed limits or user defined preferences for speeds on different types of road. Such approximations clearly do not yield the best results in most practical situation.

An aim of the present invention is to provide an alternative route guidance system which can provide improved route guidance information.

According to one aspect, the present provides a navigation guidance system comprising: means for storing data defining a road network; means for storing data defining traffic speeds along the roads in the road network at different times; means for receiving data from a user defining a travel plan including a source location, a destination location and a proposed travel time; and route determining means comprising: (i) means for determining traffic speeds for the roads of the road network at the proposed travel time; and (ii) means for calculating a quickest route from the source location to the destination location at the proposed travel time using the road network data and the determined traffic speeds for the roads of the road network. Such a system allows users to get accurate route guidance information for future travel plans and can provide users with a required departure time in order to arrive at the destination at a desired arrival time.

Exemplary embodiments of the present invention will now be described with reference to the accompanying drawings, in which.

Figure 1:
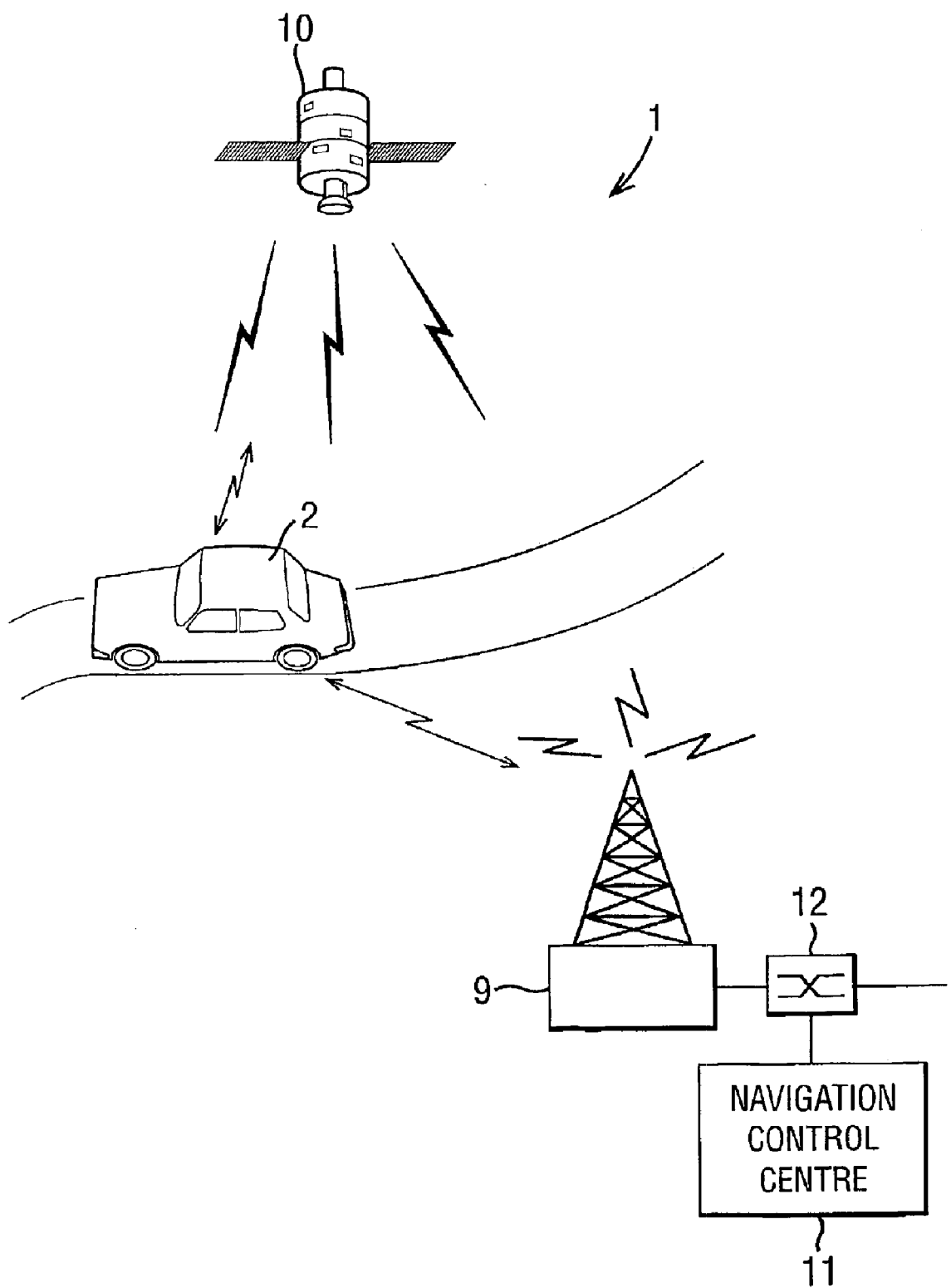
FIG. 1 is a schematic diagram illustrating a navigation system embodying the present invention.
Figure 2:
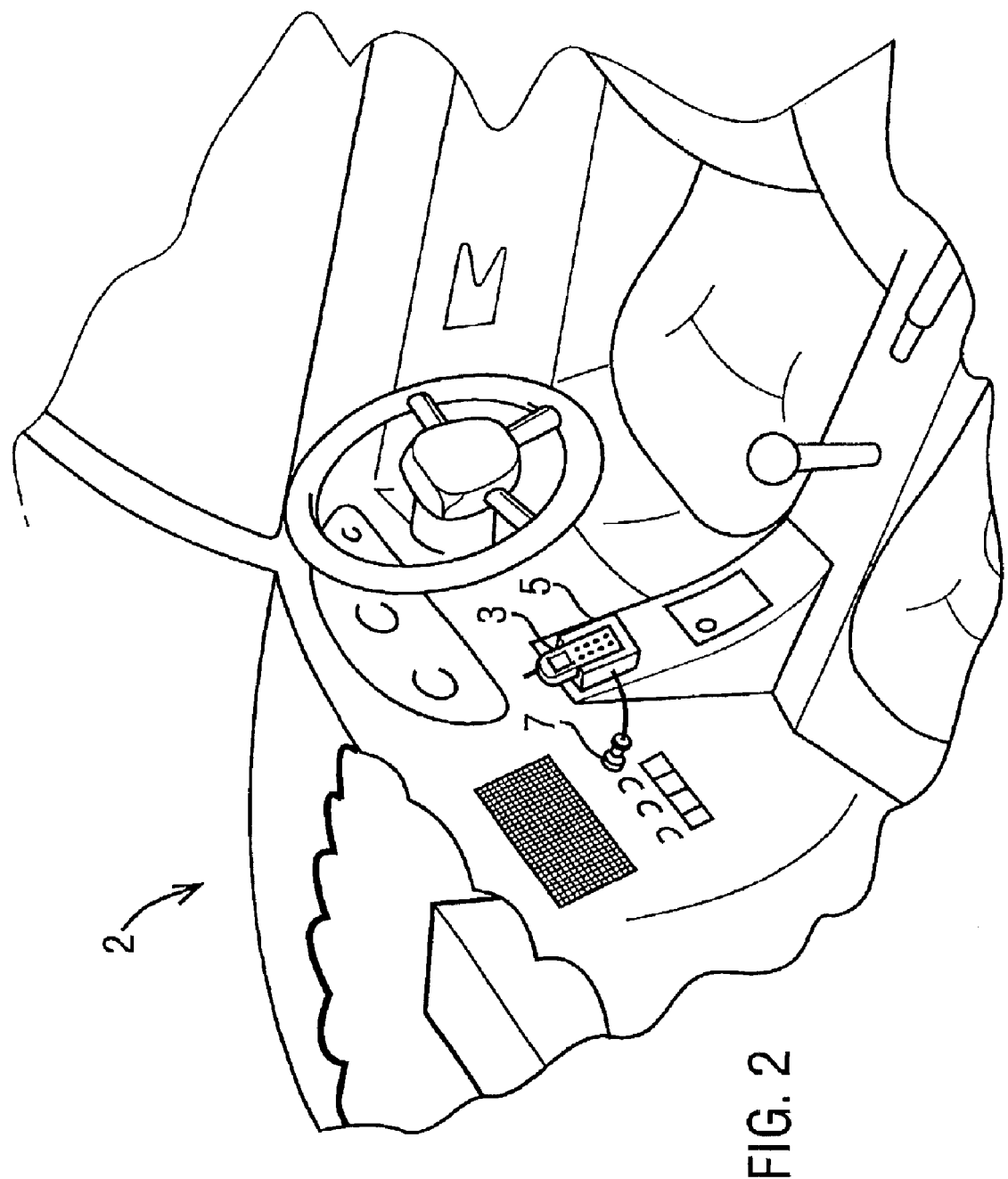
FIG. 2 is a partial cut-away view illustrating an interior of a motor vehicle illustrated in FIG. 1, showing a mobile telephone which is supported in a mounting bracket fixed to the motor vehicle.

FIG. 1 is a schematic representation of a navigation system 1 for providing a user within a motor vehicle 2 with navigation information for guiding the user to a selected destination. The navigation information is provided to the user by a navigation control centre 11 in response to a request made by the user. In this embodiment, both the request and the subsequently determined navigation information are transmitted between the user and the navigation control centre via the user's mobile telephone 3 (shown in FIG. 2 mounted in a cradle 5 and powered from the cigarette lighter socket 7), the mobile base station 9 and the telephone switching network 12. The navigation control centre 11 maintains time-related models for actual traffic speeds expected on each section of road in a road database. This allows the navigation control centre 11 to be able to provide the user with relatively accurate route guidance information to a selected destination, even during rush hour or at off-peak times. This also allows the system to be able to calculate more accurately the time that the user will have to set off from the starting location to arrive at the destination at a required arrival time.

In this embodiment, the user's telephone or vehicle also includes a GPS receiver for receiving position, speed and course over the ground information which it determines from signals received from overhead satellites 10. This information is also transmitted to the navigation control centre 11 through the telephone link, so that the navigation control centre 11 can track the user's location over the determined route and provide the user with updated route guidance information as appropriate. The navigation control centre 11 can receive navigation queries from a number of different users having mobile telephones 3 (or similar communication devices) and can then provide the appropriate navigation instructions back to the respective user. The type of query that the navigation control centre 11 can respond to include:

i) Where am I?
ii) Where is the nearest service station, restaurant etc?
iii) How do I get to Lymington, Oxford, the nearest service station etc?
iv) What is the shortest route, quickest route or the most scenic route to get to town X from my current location?
v) If I wish to arrive at town X at time T, at what time should I start from town Y?

In this embodiment, the navigation information transmitted back from the navigation control centre 11 to the mobile telephone 3 includes voice synthesised instructions which are output to the user through the speaker of the mobile telephone 3.

Figure 3:
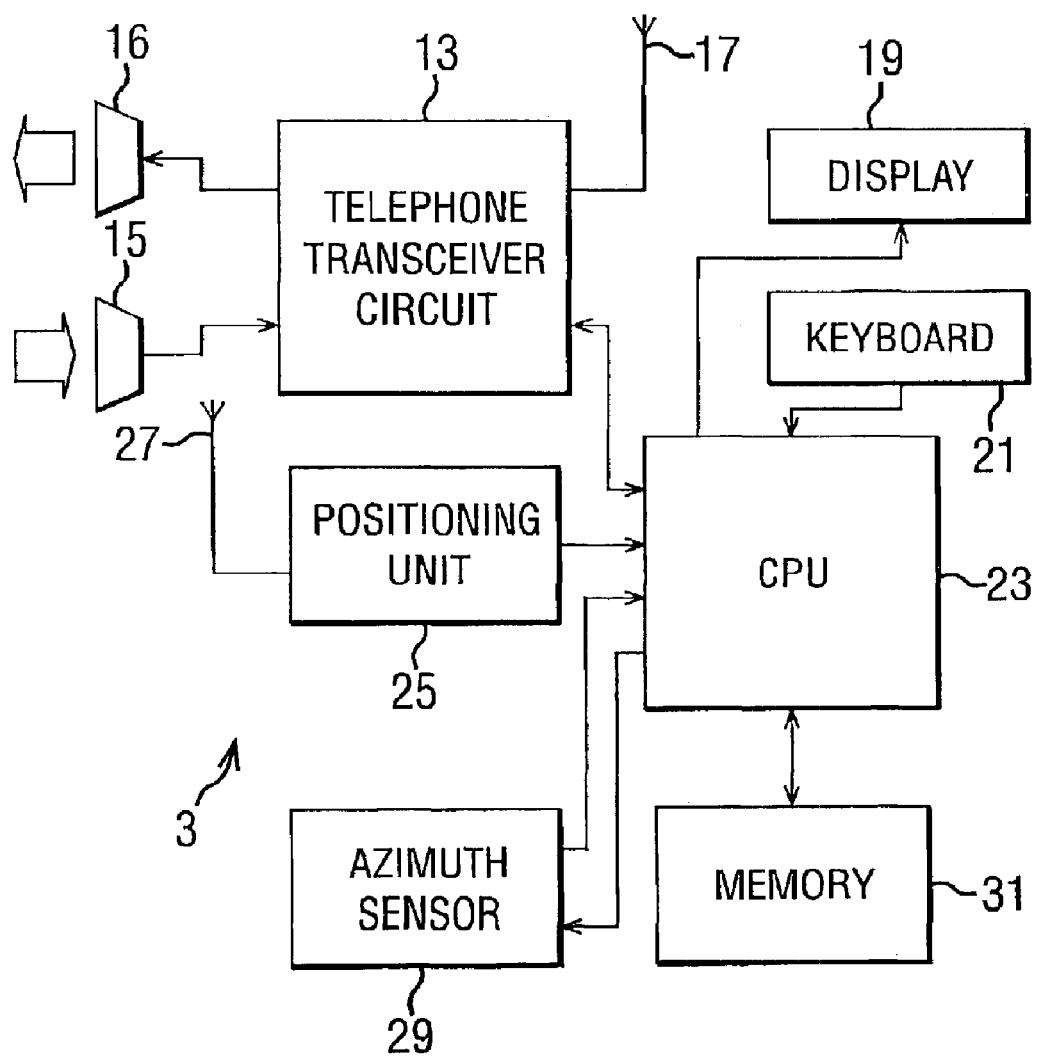
FIG. 3 is a schematic block diagram of the mobile telephone shown in FIG. 2.

FIG. 3 illustrates in more detail the main components of the mobile telephone 3 used by the user in this embodiment.

As shown, the mobile telephone 3 includes a telephone transceiver circuit 13 which is operable to receive voice data from the base station 9 and to transmit voice data to the base station 9 through the communications aerial 17. The voice data received from the base station 9 is decoded by the telephone transceiver 31 and output to the speaker 16. Similarly, the speech signal of the user is converted by the microphone 15 into a corresponding electrical signal which is encoded into voice data by the telephone transceiver 13 and transmitted to the base station 9 via the aerial 17.

The mobile telephone 3 also includes a central processing unit (CPU) 23, display 19 and keyboard 21. The keyboard 21 allows the user to enter the number of the party to be called as well as, for example, any text query to be sent to the navigation control centre 11. As with a conventional telephone, during a dial up operation, the number being entered by the user is displayed on the display for verification purposes. Once the user has confirmed the number to be dialled, the CPU 23 passes the appropriate signalling information to the telephone transceiver 13 for transmission to the base station 9, for setting up the appropriate call connection. The mobile telephone 3 also includes a memory 31 including RAM which provides a working memory for the telephone as well as ROM which stores user telephone numbers and control software for controlling the operation of the telephone 3.

As shown in FIG. 3, in this embodiment, the mobile telephone 3 also includes a positioning unit 25 (which in this embodiment is a GPS receiver) which is operable to receive GPS satellite signals through the GPS aerial 27. The positioning unit 25 provides the CPU with a position signal, a speed over the ground signal and a course over the ground (COG) signal, which are constantly updated (every second or so) while the mobile telephone 3 has direct communication with a sufficient number of GPS satellites 10. The mobile telephone 3 also includes an azimuth sensor 29 which provides an indication of the current orientation of the mobile telephone 3 relative to some reference bearing, such as North. This orientation information is also passed to the CPU 23 which stores the information in the memory 31. The stored position and orientation information is then transmitted to the navigation control centre 11 automatically or when prompted to do so by the control centre 11.

Figure 4:
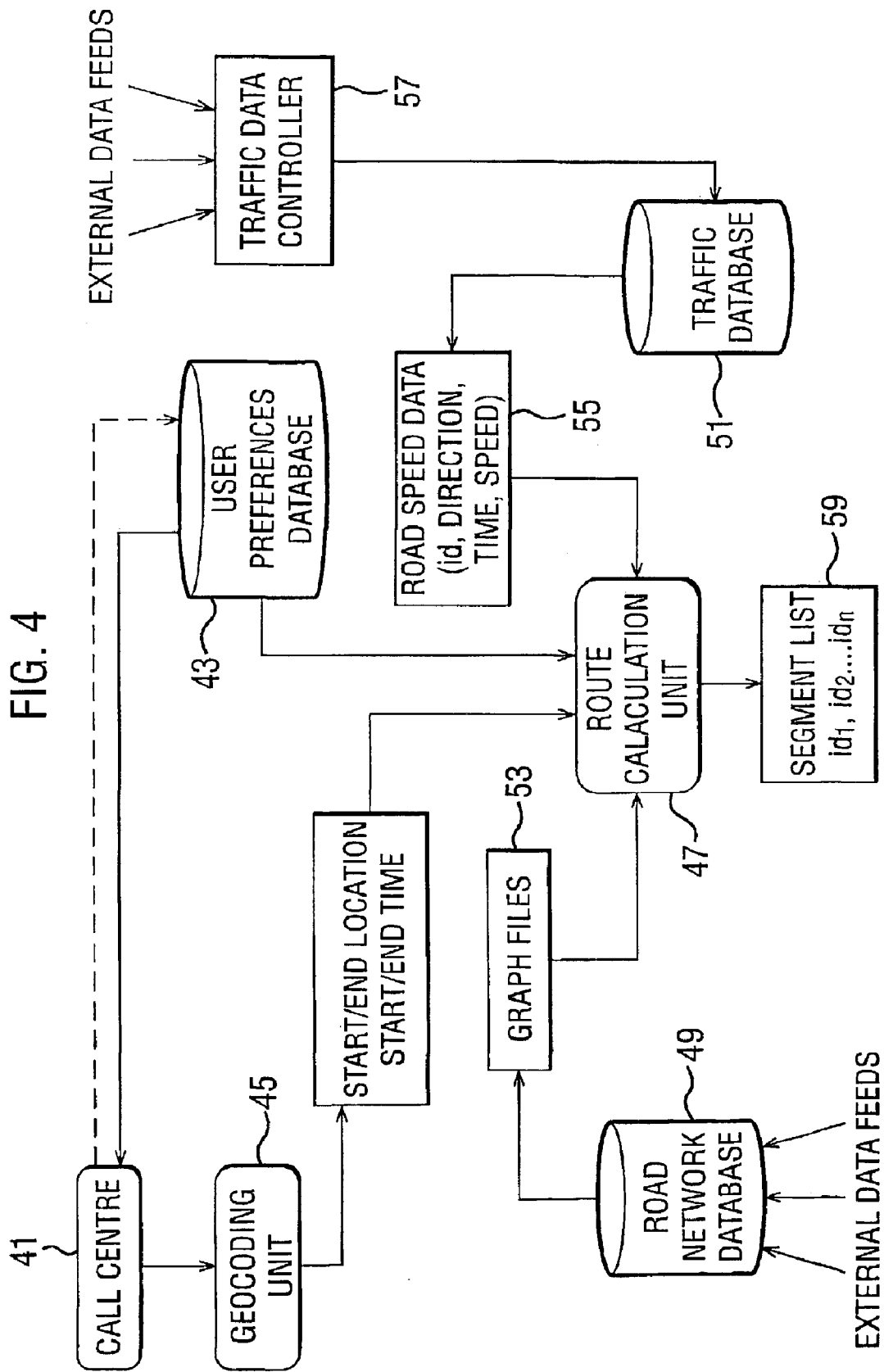
FIG. 4 is a schematic block diagram illustrating the main components of a navigation control centre which forms part of the system shown in FIG. 1 used to calculate a route from a specified start location to a specified end location.

FIG. 4 is a schematic block diagram illustrating the main components of the navigation control centre 11 which are used to determine a route from a start location to an end location for a given time for the start or end of the journey. As shown, the system includes a call centre 41 which acts as the interface between the user and the route calculation system. The call centre 41 may be entirely automatic or it may include a human operator. As those skilled in the art will appreciate, if the call centre 41 is to be entirely automatic, then it will need to have appropriate speech recognition circuitry and/or text processing circuitry for converting the user's navigation query into appropriate data which can be processed by the route calculation system. As shown, the call centre 41 also receives an input from a user preferences database 43 which defines, amongst other things, the preferred format of the navigation instructions for each user (e.g. whether distances are to be output to the user in miles or kilometres). The call centre 41 can also set user preferences within the database 43 in response to commands received from the user.

In response to receiving a navigation request, the call centre 41 outputs the user defined start and end location to a geocoding unit 45 which transforms the user defined locations (which may be in terms of place names, post codes, telephone numbers etc) into latitude and longitude coordinates which it passes, together with any defined start or end time for the journey, to a route calculation unit 47. The route calculation unit 47 then calculates the appropriate route from the start location to the end location using data from a road network database 49, data from a traffic database 51 and user preferences from the user preferences database 43.

The road network database 49 holds data which defines the interconnectivity of available road segments, the segment length, direction and the road and street name of which the road segment forms a part. In this embodiment, the route calculation unit 47 does not directly navigate through the data in the road network database 49, since it generally includes more information (such as the road names and the like) than is strictly necessary to calculate the route and hence is slower to navigate through. Instead, in this embodiment, a set of graph files 53 are generated from the data stored in the road network database 49 which define the available road segments, their interconnectivity, their direction and their length. As illustrated in FIG. 9, the road network database 49 can be updated by data from external data feeds. These feeds may come from, for example, government departments in charge of road planning when new roads are built or when existing two way roads get changed into one way roads or vice versa.

The traffic database 51 is associated with the road network database 49 and provides an expected traffic speed for each road segment stored in the road network database at any defined time of day, day of week and time of year in relation to other factors which may affect the road speed such as school holidays, planned roadworks, annual events etc. In this embodiment, the traffic database 51 also includes data which is not needed by the route calculation unit 47. Therefore, in order to speed up the route calculation process, appropriate road speed data 55 is extracted from the traffic database 51 for use by the route calculation unit 47. The extracted road speed data defines, for each road segment, the road segment's identification (id), the direction of travel along the road segment, the time of travel along the road segment and the speed of the traffic flow for that segment at that time. The route calculation unit 47 can then use this road speed data 55 together with the graph files 53 to calculate the quickest route from the specified start location to the specified end location whilst maintaining a record of the expected time of day during the route using the specified start or end time for the journey, the road speeds and the road segment lengths.

In this embodiment, the traffic database 51 can be updated permanently or on a temporary basis using real time data to allow for temporary road speed variations due to, for example, road traffic accidents, road signal failures, temporary roadworks etc. In this embodiment, the traffic database 51 is updated by a traffic data controller 57 which generates the data held permanently or temporarily in the traffic database 51. The traffic controller 57 may receive defined road speeds from external sources such as the Automobile Association (AA) or it may determine such speeds from data that it receives from external sources such as the Traffic Master System available in the UK. For example, a pattern of road speeds observed during daily rush hours may be modelled by the traffic data controller 57 for permanent inclusion in the traffic database 51.

In this embodiment, the traffic data controller 57 is also operable to predict near-future traffic flows (e.g. over the next several hours) based on observed traffic flows or traffic incidents, using predefined rules. FIG. 5 illustrates various different speed-time characteristics which can be stored for each road segment in the traffic database.

Figure 5A:
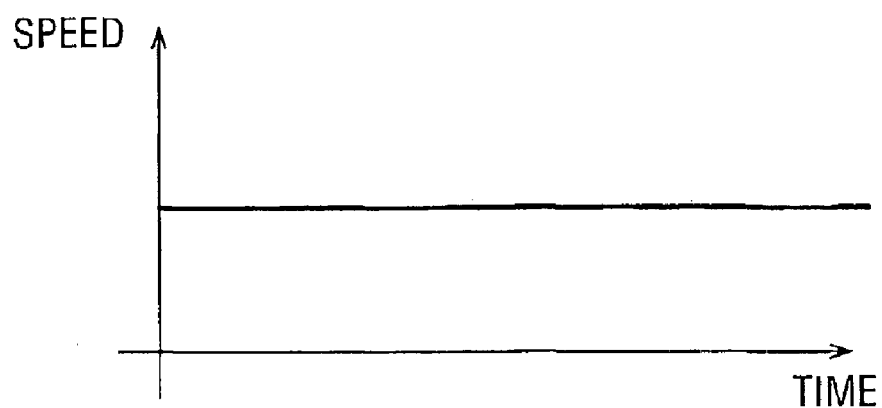
FIG. 5a is a speed time plot illustrating a static speed characteristic which can be used to define the traffic speed over a road segment.

In particular, FIG. 5a shows a constant speed-time characteristic which is stored for road segments for which the traffic speed does not change. This type of static speed-time characteristic is the type of characteristic that conventional navigation systems employ and is usually defined either by user preferences or by national speed limits for the road segment.

Figure 5B:
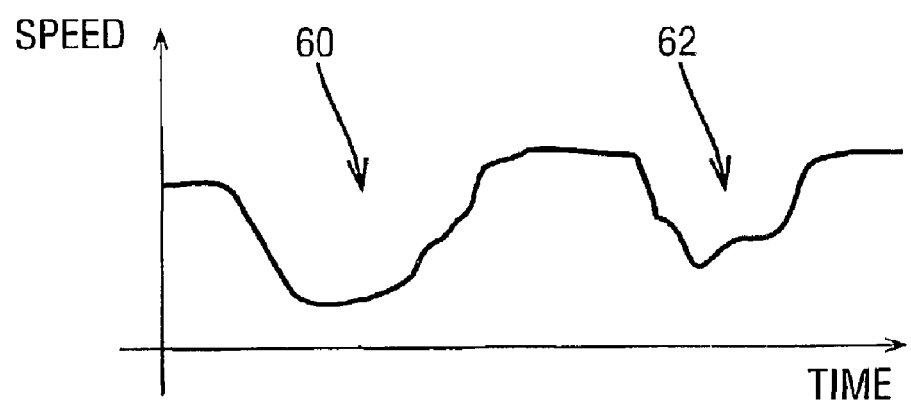
FIG. 5b is a speed time plot illustrating a time varying speed characteristic which can be used to define the traffic speed over a road segment.

FIG. 5b is a plot illustrating a time varying speed-time characteristic which illustrates how the traffic speed over a road segment may vary with time. The speed-time characteristic shown in FIG. 5b might, for example, correspond to the speed characteristic for a road segment over a 24 hour period, with the two dips 60, 62 in the characteristic representing morning and evening rush hours during which the speed on the road segment decreases. In this embodiment, a different speed-time characteristic for each day of the year is stored in the traffic database 51 for each road segment defined in the road network database 49.

Figure 5C:
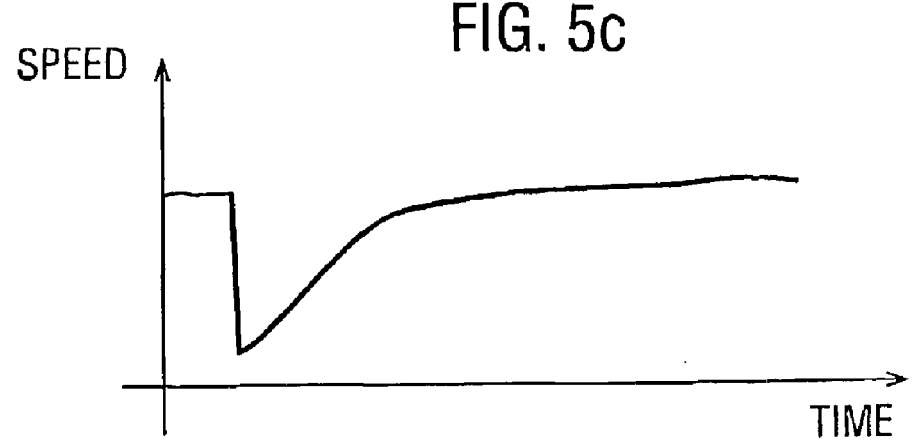
FIG. 5c is a speed time plot illustrating a dynamic change to a speed characteristic which can be used to define the traffic speed over a road segment.

Finally, FIG. 5c illustrates a temporary speed-time characteristic which may be used to model the expected traffic speed on a road segment after an observed change in the steady state road segment speed (which may occur because of an accident on that road segment). The shape of the characteristic shown in FIG. 5c can be determined in a number of different ways. For example, the decay shape may be modelled by a simple first order model with some predetermined time constant (e.g. 2 hours). A more sophisticated model may be used in order to incorporate other knowledge of the incident (such as a traffic report issued by the police). Further, if the navigation control centre 11 is controlling the movements of a significant number of users into the affected area, then it may directly influence the traffic in the vicinity of the incident. Consequently, the traffic data controller 57 can determine an appropriate shape for the speed-time characteristic for the various road segments based on this additional knowledge of the planned routes of other road users. In this embodiment, temporary speed-time characteristics such as the one shown in FIG. 5c take precedence over the daily characteristics stored for each road segment.

As shown in FIG. 4, the output from the route calculation unit 47 is a segment list which comprises an ordered sequence of road segment identifications which define the route to be taken from the specified start location to the specified end location. If appropriate, the route calculation unit 47 will also output the time of arrival at the specified end location if the user indicates the start time of the journey or it will output a required start time to the journey if the user specifies a required arrival time at the destination. The segment list 59 is then converted into appropriate driving instructions for the user.

Figure 6:
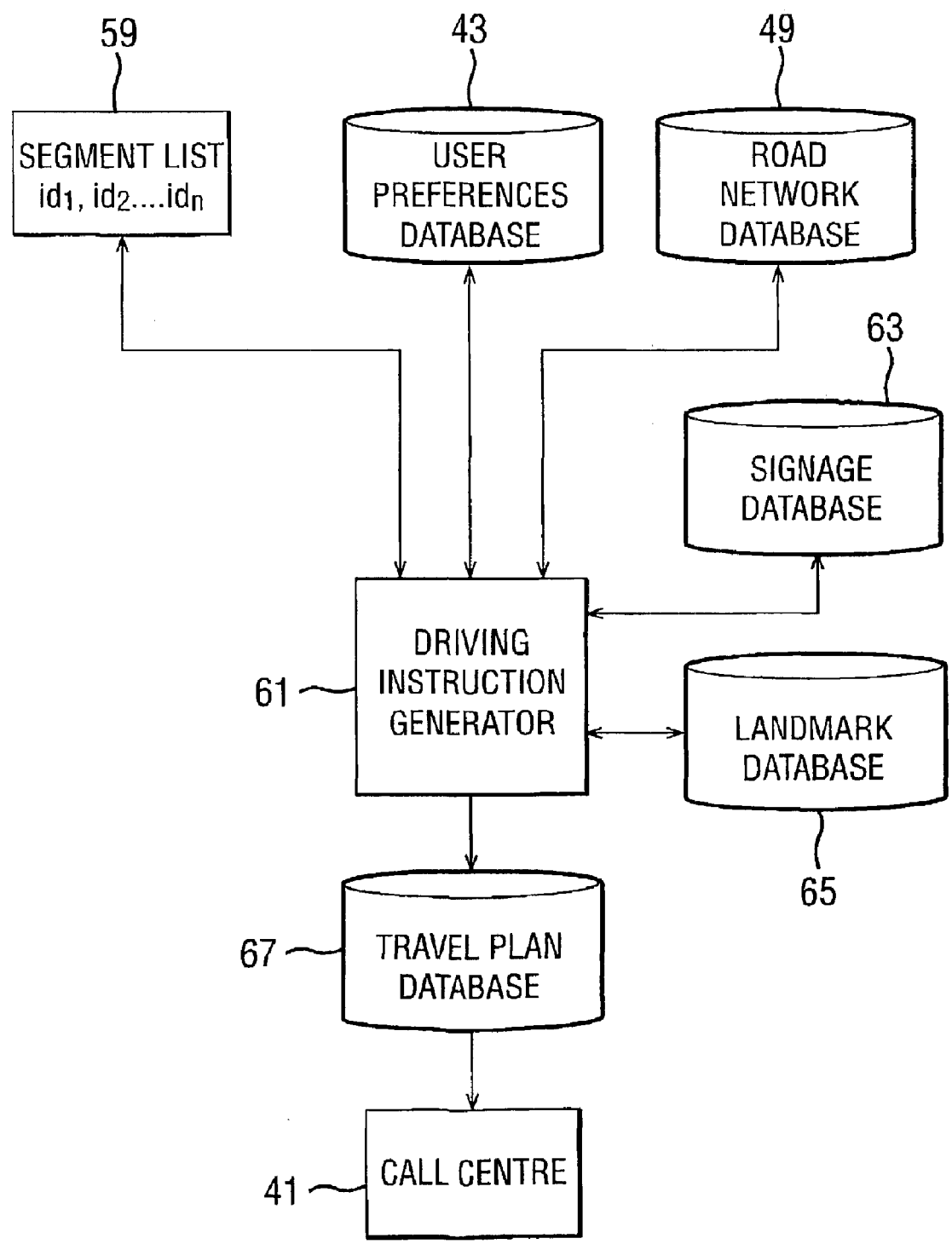
FIG. 6 is a schematic block diagram illustrating the main components of a driving instruction generation system which forms part of the navigation control centre shown in FIG. 1 and which is used to convert the route guidance information obtained from the system shown in FIG. 4 into user understandable instructions.

The main components of the navigation control centre 11 which generate the driving instructions are shown in FIG. 6. As shown, the system includes a driving instruction generator 61 which receives the segment list 59 generated by the route calculation unit 47 together with any user preferences from the user preference database 43 and data from the road network database 49 for the roads defined by the segments in the segment list 59. The driving instruction generator 61 also receives data from a signage database 63 and from a landmark database 65. The signage database 63 stores the location and content of signposts that are located along the side of the roads defined in the road network database 49 and the landmark database 65 stores the locations and characteristics of various landmarks along the roads defined in the road network database 49.

In operation, the driving instruction generator 61 receives the segment list 59 from the route calculation unit 47 together with any user preferences from the user preference database 43. Using the road segments ids contained within the segment list 59, the driving instruction generator 61 retrieves the appropriate roads and junctions to be traversed for the calculated route from the road network database 49. The driving instruction generator 61 also retrieves appropriate signage data from the signage database 63 and landmark data from the landmark database 65 in order to generate a list of driving instructions which are in a suitable form for output to the user. In this embodiment, the thus generated driving instructions are stored in a travel plan database 67 together with the driving instructions for other user's navigation queries. In this embodiment, the driving instructions generated by the instruction generator 61 are textual instructions which can be transmitted to the user's mobile telephone as a text message or which can be converted into speech either by a text to speech converter or by a human operator. For example, if the user's query is to obtain instructions for getting from London Heathrow Airport to Cambridge, then the determined driving instructions may be as follows:

take the Northbound M4;
 at junction 4 of the M4 turn off on to the M25 towards Rickmansworth;
 at junction 27 of the M25 turn off on to the northbound M11; and
 at junction 13 of the M11 turn off on to the A1303 until you arrive at Cambridge.

In this embodiment, the thus generated driving instructions are not downloaded all at once to the user. Instead, the call centre 41 monitors the position of the user and provides the appropriate driving instructions one at a time to the user as the user progresses along the calculated route. As mentioned above, this position information is provided by the GPS receiver located in the user's mobile telephone 3.

As mentioned above, the navigation control centre can process navigation queries in respect of future travel plans and can provide estimated departure times in order to arrive at the selected destination by a predetermined arrival time. However, the road speed data may be updated after the system has provided the user with a response to their initial query. Therefore, in this embodiment, the navigation control centre 11 is operable to store each navigation query and the determined segment list, driving instructions, departure time and arrival time in the travel plan database 67 so that each of the travel plans can be re-evaluated in light of updated road speed data. In this embodiment, this re-evaluation does not recalculate a new route given the new road speed data, it simply recalculates the arrival time for the previously calculated route using the updated road speed data and the previously calculated departure time. As a result, the computation can be performed quickly for multiple navigation queries. If the arrival time has changed considerably, then an appropriate warning can be given to the user so that they can change their departure time accordingly.

Figure 7:
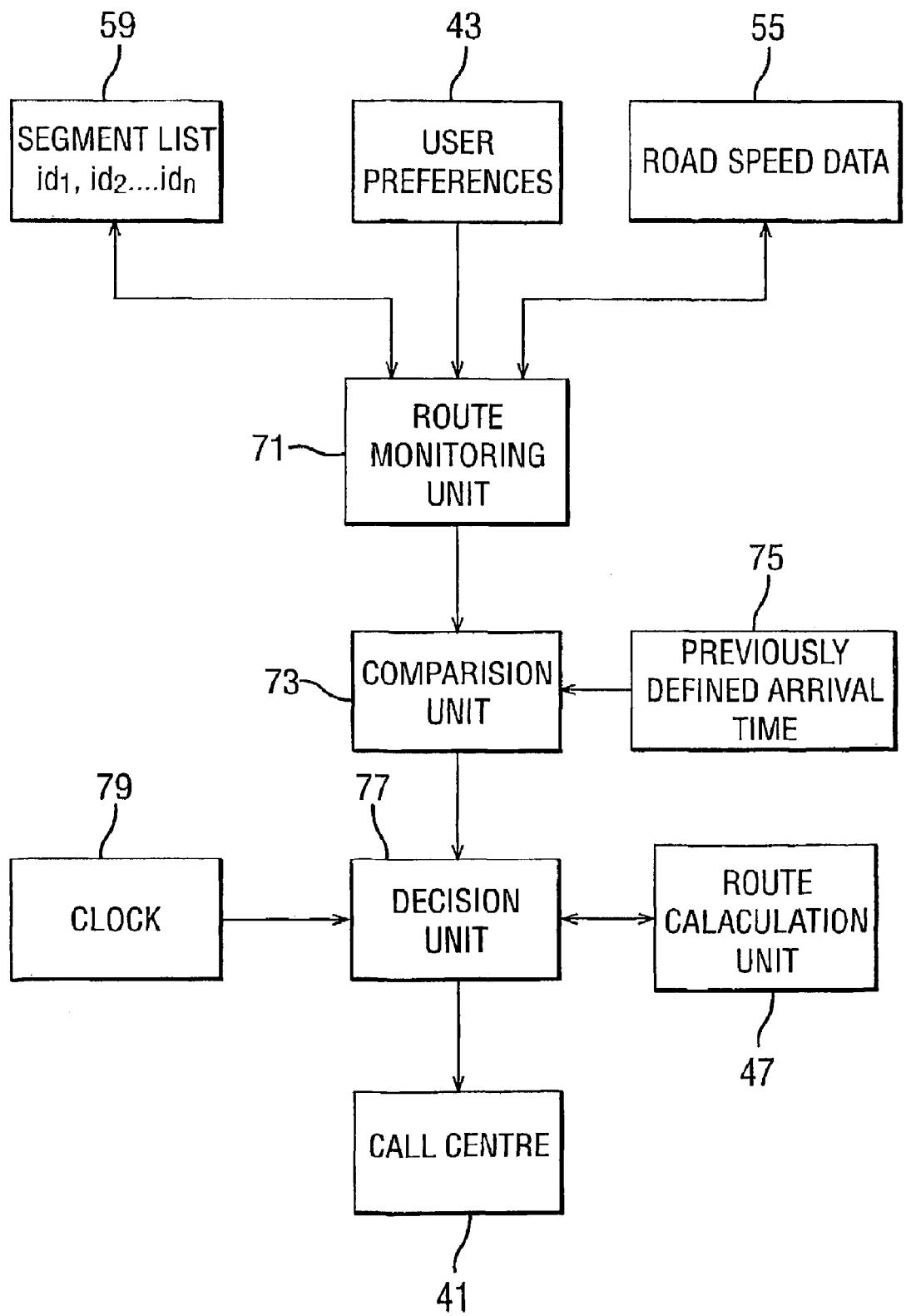
FIG. 7 is a block diagram illustrating the main components of a route monitoring system which forms part of the navigation control centre shown in FIG. 1.
Figure 8:
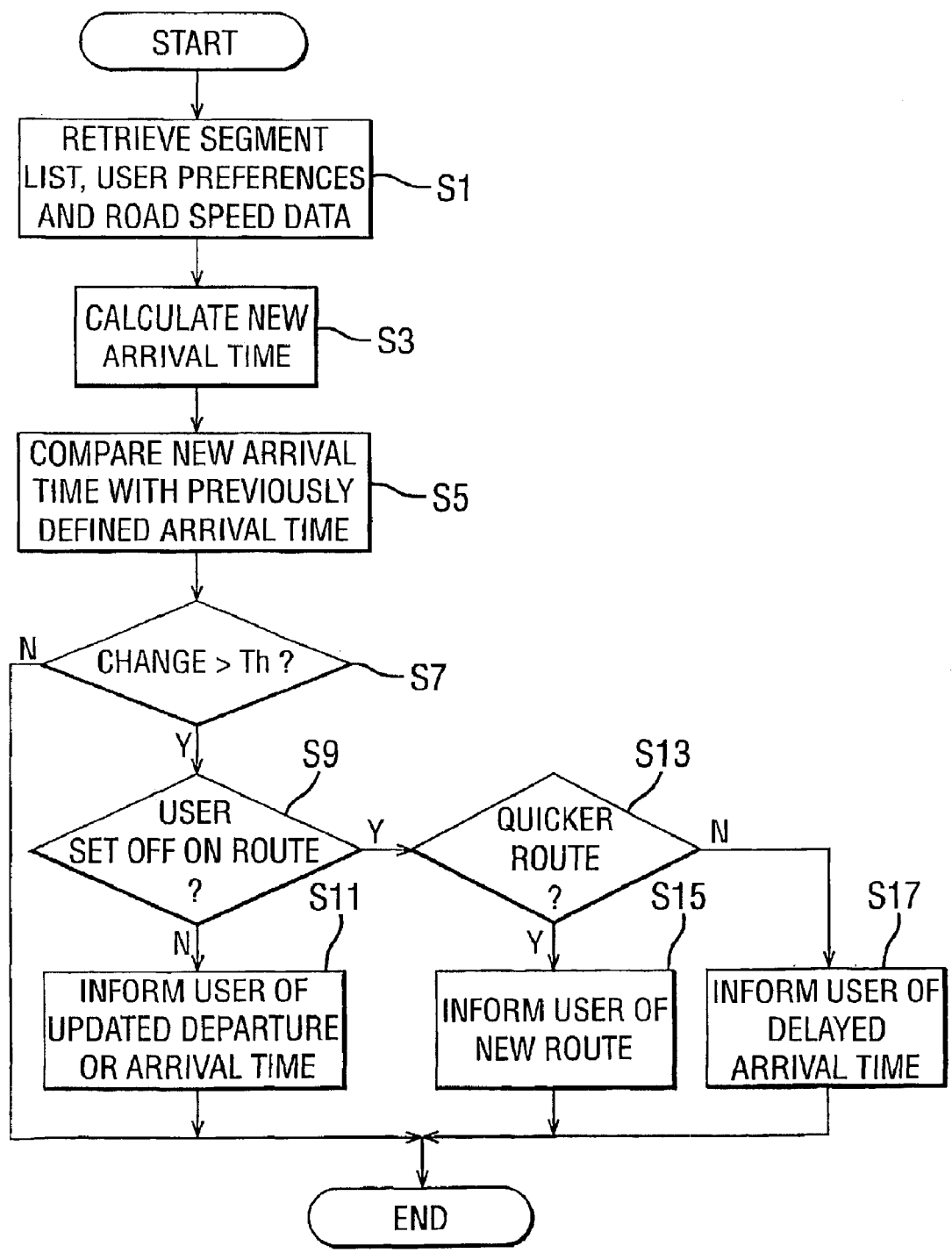
FIG. 8 is a flow chart illustrating the processing steps performed by the route monitoring system shown in FIG. 7.

The main components of the navigation control centre 11 which perform this monitoring function are shown in FIG. 7 and the processing steps performed are shown in FIG. 8. As shown in FIG. 7, the system includes a route monitoring unit 71 which receives, in step S1, the segment list 59 together with user preferences from the user preferences database 43 and the updated road speed data 55. Using this information, the route monitoring unit 71 calculates, in step S3, the new arrival time at the specified destination from the user's current position or from the specified start location and departure time if the user has not yet set off. The new arrival time calculated by the route monitoring unit 71 is then output to a comparison unit 73 which compares, in step S5, the new arrival time with the previously defined arrival time 75. The comparison result is then output to a decision unit 75 which compares, in step S7, the change in the arrival time with a predetermined threshold value (Th). If the change in the arrival time is less than the threshold value then the decision unit takes no action and the processing for this route ends. If, however, the change in the arrival time is greater than the threshold value (e.g. the new arrival time is half an hour later or half an hour earlier than the previously defined arrival time), then the decision unit 75 determines, in step S9, whether or not the user has already set off on the route (making reference to the proposed departure time and the current time provided by the clock 79). If he has not set off, and the user has specified either a desired arrival time or a departure time, then in step S11, the decision unit 75 informs the user (via the call centre 41) of an updated departure time (in order to arrive at the destination at the required arrival time) or an updated arrival time (if the user sets off on the journey at the specified departure time).

In this embodiment, if the decision unit 75 determines at step S9 that the user has already set off on route, then it instructs the route calculation unit 47 to recalculate the quickest route to the desired destination from the user's current position. If in step S13, the route calculation unit 47 determines that there is a quicker route, then at step S15, the decision unit 75 informs the user of the new route and then the processing ends. If, however, the route calculation unit 47 cannot find a quicker route, then in step S17, the decision unit 75 informs the user of the delayed arrival time at the specified destination.

The above monitoring procedure is repeatedly performed for each "pending" travel plan until the user arrives at the specified destination or until the navigation query has been cancelled by the user or by a system administrator. In this embodiment, the interval between each monitoring operation depends on whether or not the user is currently on route or whether or not the travel plan is in respect of a future travel arrangement. In particular, if the travel plan is for a journey to be taken next week, then the route monitoring procedure is only performed for that travel plan once every day, until the day of departure. The route monitoring procedure for this travel plan is then performed once every hour until the user sets off at which point the route monitoring procedure is carried out once every minute.

As those skilled in the art will appreciate, the system described above offers a number of advantages over the prior art navigation systems. These advantages are mainly as a result of the system maintaining time related models for traffic speeds expected on each road section in the road database, as opposed to the static road speeds that are conventionally used. As a result, if the time of a journey is known when the route is calculated, the expected traffic conditions for that journey can be extracted from the traffic database 51 and the quickest route for such conditions can be calculated more accurately than with the conventional systems. The system can also keep track of the time of day during the route calculation, and continue to update the appropriate traffic conditions for that time of day, which may well change during the duration of the planned journey. These calculations then allow the system to be able to calculate more accurately the answer to the navigation query "If I wish to arrive at town X at time T, at which time should I start from town Y?", by performing the route calculation in reverse time starting from the destination at the prescribed arrival time.

The system can also determine different routes for a journey during rush hour, or the same journey at off-peak times, and calculate the journey time appropriately. The system can also accurately plan a journey which starts before rush hour and finishes after rush hour—the point on the journey in which the rush hour is encountered will be determined and the appropriate route taken for those conditions.

Further, as described above, if the system has advised the driver of the need to start a journey at a certain time, it can subsequently change this advice on the basis of new traffic data, to instruct the journey to start earlier or later as appropriate. Further, since the system continually monitors each of the calculated routes and receives position information of each of the users, it can provide real time navigation by altering the routes (and hence driving instructions) if a road on a previously calculated route becomes congested or if the user deviates from the calculated route.

Modifications and Alternative Embodiments

A description has been given above of a navigation system employing a mobile telephone and a fixed navigation control centre. Rather than being part of a mobile telephone, the navigation system may form part of a hand held personal digital assistant (PDA), web browser, laptop PC or the like. Although not preferred, the navigation control system described above may be provided as an autonomous system within the user's vehicle. This is not preferred, because of the large amount of data that would need to be stored within the vehicle and the need for constant updating of each user's databases.

In the above embodiment, the navigation control centre received position information for the user from a GPS receiver built into the user's mobile telephone. This enabled the system to be able to track the user along the calculated route and to warn the user if a new route should be taken or if the user deviates from the calculated route. As those skilled in the art will appreciate, the navigation control centre may obtain the position information from alternative sources. For example, the user may inform the control centre himself of his current location. Alternatively, the position information may be provided from the mobile telephone network using, for example, the Cursor system proposed by Cambridge Positioning Systems Limited. As a further alternative, the system may be arranged to estimate the user's current location given the starting time for the journey, the current time and the road speeds for the roads along which the user should have travelled. However, this is not preferred since it is likely to be less accurate.

In the above embodiment, the driving instructions that were generated were sent to the user either as text messages or as voice messages. As an alternative or in addition, the system may transmit a "thumbnail" sketch or map of the route to be taken. This may be transmitted either as a bit map or as a series of vectors representing the route to be traversed.

In the above embodiment, the navigation control centre converted the determined segment list into a set of user understandable driving instructions which were then transmitted one by one to the user when appropriate. In an alternative embodiment, the driving instructions may be downloaded at once to the mobile telephone which could then track the user's progress along the calculated route and issue the driving instructions as appropriate. Alternatively still, the calculated segment list may be transmitted to an on board computer in the user's vehicle for processing and conversion into the driving instructions. Such an embodiment would be preferred where the on board computer also includes a database of map data from which a high resolution image of the route to be traversed can be displayed to the user on a display in the vehicle.

In the above embodiment, an azimuth sensor was provided in the user's telephone so that the orientation of the telephone can be determined and hence appropriate instructions can be given to the user to identify an initial direction to travel. If the handset is to be made as simple as possible, then the azimuth sensor may be omitted. In this case, the user may have to revert to a more traditional technique of identifying an initial bearing, such as identifying the intersection of two streets.

In the above embodiment, a single navigation control centre was provided. As those skilled in the art will appreciate, several navigation control centres may be provided, each operating within a distinct locality of a geographic region. For example, several navigation control centres may be provided in and around large cities whilst one or two may be provided between the cities in more rural areas. In such an embodiment, the control centres would be arranged to communicate with each other so that as a user enters the geographic area of another navigation control centre, a "handover" procedure can be performed. In this way, the navigation control centres form a distributed network of navigation centres.

In the navigation control system described above, a road network database and a traffic database were used to provide information for route calculation. As those skilled in the art will appreciate, these databases may be provided by third party systems, with the navigation control system only operating to use the data from those databases.

In the embodiment described above, the navigation centre receives position information of each user. The navigation control centre can then track the changing positions and determine the speed of each user over the road segments. It can then use this actual speed data to update the road speed data that is used during the route calculations. Further, if the user's mobile telephone employs a GPS type receiver (which provides speed over the ground information), then the mobile telephone can inform the navigation control centre of the user's speed. In this case, the navigation control centre does not need to track the user's position to determine the speed although it would need the position information to know to which road segment the recorded speed applied.

In the above embodiment, the monitoring system repeatedly recalculated the expected arrival time at the specified destination given the proposed departure time and the road speed data. The purpose of this monitoring was to determine whether or not any changes to the road speed data would affect any user's travel plans. As those skilled in the art will appreciate, this can also be achieved by fixing the arrival time and navigating through the proposed route in reverse time in order to determine the new departure time. The new departure time can then be directly compared with the original departure time and the user warned accordingly if it has changed significantly.

In the above embodiment, the system continuously monitored the expected arrival time of the user at the specified destination and if it changed by more than a predetermined amount, then it gave the user an updated departure time. The threshold value used in determining whether or not to warn the user may be set by a system administrator or it may be different for each user and may be defined in the user preferences. A different threshold value may also be used for different travel plans for the same user if desired.

In the above embodiment, the user input the navigation query from the users mobile telephone. As an alternative users can input their navigation query and receive the navigation instructions through, for example, an Internet connection to the navigation control centre. In this case, when the user is planning the route, the user may use a fixed landline connection to the Internet. However, during the route, the user will need to use a mobile communication link between the user and the navigation control centre.

In the above embodiment, the route calculation unit calculated the best route from the specified start location to the specified end location. In an alternative embodiment, the route calculation unit may calculate the best route together with one or more alternative routes that the user may take. The system need not inform the user of these alternative routes but may simply store them for use if part of the best route becomes congested. Further, even if the best route doesn't deteriorate, one of the alternative routes might improve sufficiently for it to be worth mentioning. For example, one of the alternative routes might have had a blockage when the original route was being calculated which subsequently cleared and which may offer the user a significant reduction in the journey time. In this case, the system could output to the user the proposed new route together with the appropriate departure and arrival times.

In the above embodiment, a number of processing units have been described for use in the navigation control centre. As those skilled in the art will appreciate, these processing units may be dedicated hardware circuits or they may be computer software modules run on a conventional programmable processor. A computer program or programs used to configure such a programmable processor to carry out the processing discussed above may be in the form of source code, object code, a code intermediate source and object code such as a partially compiled form, or in any other form. Such computer programs may be stored in a memory at the time of manufacture of the device or it may be loaded into memory by either downloading the program file from, for example, the Internet or from a storage medium such as a CD ROM or the like.

What is claimed is:

1. A navigation guidance system comprising;

means for storing data defining a road network within a geographical area;

means for storing data defining speed-time characteristics for roads of the road network, which speed-time characteristics define traffic speeds along the roads in the network at different times;

means for receiving data from a user defining a travel plan including a source location, a destination location and a proposed travel time; and route determining means comprising:

(i) means for determining traffic speeds for the roads of the road network at the proposed travel time using said data defining said speed-time characteristics; and (ii) means for calculating a quickest route from the source location to the destination location defined in the travel plan at the proposed travel time using the data defining the road network and the determined traffic speeds for the roads of the road network.

2. A system according to claim 1, wherein said proposed time of travel specifies a desired arrival time at the destination and wherein said route determining means is operable to calculate the required departure time from the source location in order to arrive at the destination at the desired arrival time.

3. A system according to claim 2, further comprising means for updating the data defining the speed time characteristics for the roads of the road network.

4. A system according to claim 3, further comprising means for monitoring the calculated route using the updated road speed data in order to determine whether or not a new departure time from the source location is required in order to arrive at the destination at the desired arrival time.

5. A system according to claim 4, wherein said monitoring means is operable to calculate the expected arrival time of the user at the destination based on the original departure time, the calculated route and the updated road speed data and is operable to recalculate a new departure time if said expected arrival time is a predetermined amount before or after the desired arrival time.

6. A system according to claim 4, wherein said monitoring means is operable to recalculate the departure time in reverse time starting from the destination at the required arrival time using the calculated route and the updated road speed data and is operable to advise the user of the new departure time if the new departure time has changed by a predetermined amount from the originally calculated departure time.

7. A system according to any of claims 4 to 6, wherein said monitoring means is operable to perform said determination at predetermined time intervals, until the user arrives at the destination location.

8. A system according to claim 7, wherein said monitoring means is arranged so that said predetermined time intervals vary depending on a time difference between a current time and the calculated departure time.

9. A system according to any of claims 4 to 6, wherein if said monitoring means determines that a new departure time is required after the user has set off from the source location, then said monitoring means is operable to cause said route determining means to try to find a quicker route to the destination.

10. A system according to claim 1, wherein said proposed time of travel is defined as a specified departure time and wherein said route determining means is operable to track time from the indicated departure time and to use road speed values for each road along the calculated route corresponding to the time at which the user is expected to travel on the road as calculated from the specified departure time.

11. A system according to claim 1, further comprising means for outputting the calculated route and/or the determined departure time to the user.

12. A system according to claim 1, wherein said data defining said road network comprises data defining the location of nodes corresponding to road junctions and data defining links connecting the nodes representing road segments between the road junctions.

13. A system according to claim 12, wherein at least one speed-time characteristic is stored for each road segment.

14. A system according to claim 12 or 13, wherein each road segment is stored with a segment identification number and wherein said calculating means is operable to output a list of road segment identification numbers corresponding to the route to be traversed from the source location to the destination location.

15. A system according to claim 14, further comprising means for converting said sequence of road segment identification numbers into a sequence of driving instructions defining the road names and road intersection points to be traversed along the calculated route.

16. A system according to claim 15, further comprising means for outputting said driving instructions to the user as a set of spoken or text instructions.

17. A system according to claim 16, wherein said receiving means is operable to receive said travel plan from the user via a telephone connection and wherein said calculated route is output to the user through said telephone connection.

18. A system according to claim 1, wherein a different speed-time characteristic for each road of the road network is stored for each day of the week.

19. A system according to claim 1, wherein a different speed-time characteristic for each road of the road network is stored for each day of the year.

20. A system according to claim 1, further comprising means for generating map data for the calculated route and means for outputting the map data to the user.

21. A system according to claim 20, wherein said map data comprises graphic map data illustrating the route to be taken and wherein said output means comprises a graphical display.

22. A system according to claim 1, wherein said receiving means is operable to receive data from a plurality of different users defining travel plans for each user and wherein said route determining means is operable to determine a route for each user based on the time of travel of each user.

23. A navigation guidance method comprising the steps of:
storing data defining a road network within a geographical area;
storing data defining speed-time characteristics for roads of the road network, which speed-time characteristics define traffic speeds along the roads in the network at different times;
receiving data from a user defining a travel plan including a source location, a destination location and a proposed travel time; and
determining a route comprising the steps of:
(i) determining traffic speeds for the roads of the road network at the proposed travel time using said data defining said speed-time characteristics; and
(ii) calculating a quickest route from the source location to the destination location defined in the travel plan at the proposed travel time using the data defining the road network and the determined traffic speeds for the roads of the road network.

24. A method according to claim 23, wherein said proposed time of travel specifies a desired arrival time at the destination and wherein said route determining step calculates the required departure time from the source location in order to arrive at the destination at the desired arrival time.

25. A method according to claim 24, further comprising the step of updating the data defining the speed time characteristics for the roads of the road network.

26. A method according to claim 25, further comprising the step of monitoring the calculated route using the updated road speed data in order to determine whether or not a new departure time from the source location is required in order to arrive at the destination at the desired arrival time.

27. A method according to claim 26, wherein said monitoring step calculates the expected arrival time of the user at the destination based on the original departure time, the calculated route and the updated road speed data and recalculates a new departure time if said expected arrival time is a predetermined amount before or after the desired arrival time.

28. A method according to claim 26, wherein said monitoring step recalculates the departure time in reverse time starting from the destination at the required arrival time using the calculated route and the updated road speed data and advises the user of the new departure time if the new departure time has changed by a predetermined amount from the originally calculated departure time.

29. A method according to any of claims 26 to 28, wherein said monitoring step perform said determination at predetermined time intervals, until the user arrives at the destination location.

30. A method according to claim 29, wherein said monitoring step is such that said predetermined time intervals vary depending on a time difference between a current time and the calculated departure time.

31. A method according to any of claims 26 to 28, wherein if said monitoring step determines that a new departure time is required after the user has set off from the source location, then said monitoring step causes said route determining step to try to find a quicker route to the destination.

32. A method according to claim 23, wherein said proposed time of travel is defined as a specified departure time and wherein said route determining step tracks time from the indicated departure time and uses road speed values for each road along the calculated route corresponding to the time at which the user is expected to travel on the road as calculated from the specified departure time.

33. A method according to claim 23, further comprising the step of outputting the calculated route and/or the determined departure time to the user.

34. A method according to claim 23, wherein said data defining said road network comprises data defining the location of nodes corresponding to road junctions and data defining links connecting the nodes representing road segments between the road junctions.

35. A method according to claim 34, wherein at least one speed-time characteristic is stored for each road segment.

36. A method according to claim 34 or 35, wherein each road segment is stored with a segment identification number and wherein said calculating step outputs a list of road segment identification numbers corresponding to the route to be traversed from the source location to the destination location.

37. A method according to claim 36, further comprising the step of converting said sequence of road segment identification numbers into a sequence of driving instructions defining road names and road intersection points to be traversed along the calculated route.

38. A method according to claim 37, further comprising the step of outputting said driving instructions to the user as a set of spoken or text instructions.

39. A method according to claim 38, wherein said receiving step receives said travel plan from the user via a telephone connection and wherein said calculated route is output to the user through said telephone connection.

40. A method according to claim 23, wherein a different speed-time characteristic for each road of the road network is stored for each day of the week.

41. A method according to claim 23, wherein a different speed-time characteristic for each road of the road network is stored for each day of the year.

42. A method according to claim 23, further comprising the step of generating map data for the calculated route and the step of outputting the map data to the user.

43. A method according to claim 42, wherein said map data comprises graphic map data illustrating the route to be taken and wherein said outputting step outputs the map data to a graphical display.

44. A method according to claim 23, wherein said receiving step receives data from a plurality of different users defining travel plans for each user and wherein said route determining step determines a route for each user based on the time of travel of each user.

45. A computer readable medium storing computer implementable instructions for controlling a processor to implement the method according to claim 23.

46. A computer implementable instructions product for controlling a processor to implement the method according to claim 23 when said instructions product is run on said processor.

47. A system according to claim 1, wherein said route determining means is operable to keep track of the time of day during the route calculation and is operable to update the appropriate traffic speeds for the roads for the time of day as it changes during the travel plan.

48. A system according to claim 47, wherein said proposed travel time defines a desired time of arrival at the destination location and wherein said route determining means is operable to perform the route calculation in reverse time starting from the destination at the desired arrival time.

49. A method according to claim 23, wherein said route determining step keeps track of the time of day during the route calculation and is operable to update the appropriate traffic speeds for the roads for the time of day as it changes during the travel plan.

50. A method according to claim 49, wherein said proposed travel time defines a desired time of arrival at the destination location and wherein said route determining step performs the route calculation in reverse time starting from the destination at the desired arrival time.

* * * * *